United States Patent

Hammond

[11] 4,077,283
[45] Mar. 7, 1978

[54] ENGINE SPEED REDUCER RESPONSIVE TO POSITIONING OF THE TRANSMISSION SHIFT LEVER

[75] Inventor: James T. Hammond, Tremont, Ill.

[73] Assignee: Caterpillar Tractor Co., Peoria, Ill.

[21] Appl. No.: 643,415

[22] Filed: Dec. 22, 1975

[51] Int. Cl.² .................. B60K 41/04; G05G 9/10; G05G 13/00

[52] U.S. Cl. .................. 74/860; 74/872; 74/471 R; 74/480 R; 74/482; 180/105 R; 123/140 MC

[58] Field of Search ........... 74/473 R, 872, 879, 74/482, 480 R, 479, 860, 857, 471 R; 123/98, 108, 140 MC, 140 R; 180/77 R, 82 R, 103 BF, 105 R; 200/61.41, 61.88, 331, 332; 335/205

[56] References Cited

U.S. PATENT DOCUMENTS

| | | | |
|---|---|---|---|
| 1,651,821 | 12/1927 | Heath | 74/872 X |
| 1,810,128 | 6/1931 | Chapel | 74/480 |
| 1,886,672 | 11/1932 | Good | 123/108 X |
| 2,001,590 | 5/1935 | Spiller | 123/108 |
| 2,346,332 | 4/1944 | Rosenthal | 180/105 R X |
| 2,443,084 | 6/1948 | Rhodes | 123/108 X |
| 2,709,376 | 5/1955 | Manchester | 74/872 |
| 3,004,435 | 10/1961 | Banker | 74/860 X |
| 3,508,454 | 4/1970 | Fanslow et al. | 74/482 |
| 3,771,154 | 11/1973 | Takei | 335/205 X |
| 3,795,157 | 3/1974 | Campbell et al. | 74/879 |
| 3,876,033 | 4/1975 | Shore | 180/105 R X |
| 3,948,116 | 4/1976 | van Pelt | 74/482 |
| 3,954,151 | 5/1976 | Budzich et al. | 180/82 R X |

*Primary Examiner*—Samuel Scott
*Assistant Examiner*—Carl F. Pietruszka
*Attorney, Agent, or Firm*—John W. Grant

[57] ABSTRACT

An engine speed reducer responsive to positioning of a transmission shift lever which selectively determines the vehicle speed range and its direction of travel includes an apparatus operatively associated with a control linkage for moving it in a direction to decrease the speed of an engine from a predetermined high speed to an intermediate speed. An actuating device is operatively connected to the apparatus and is operative in response to shifting of the transmission shift lever to a reverse speed setting automatically to actuate the apparatus so that the engine speed is reduced.

3 Claims, 6 Drawing Figures

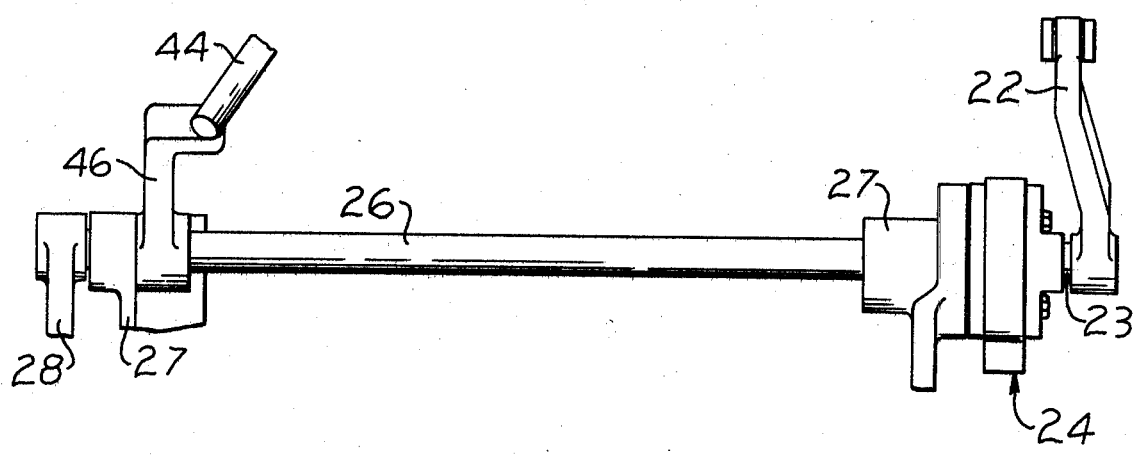
Fig-2-
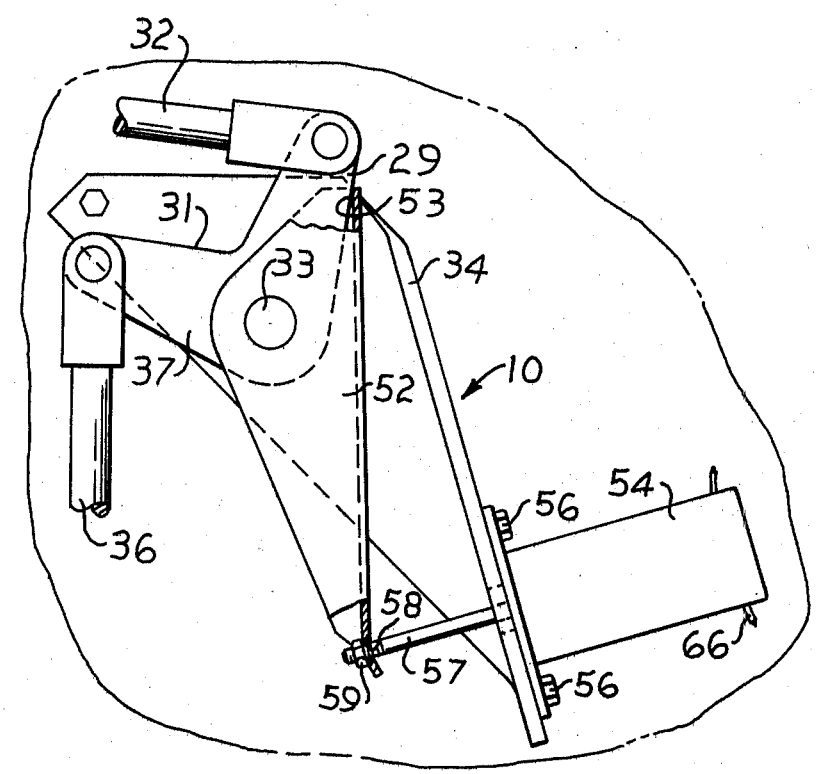
Fig-3-

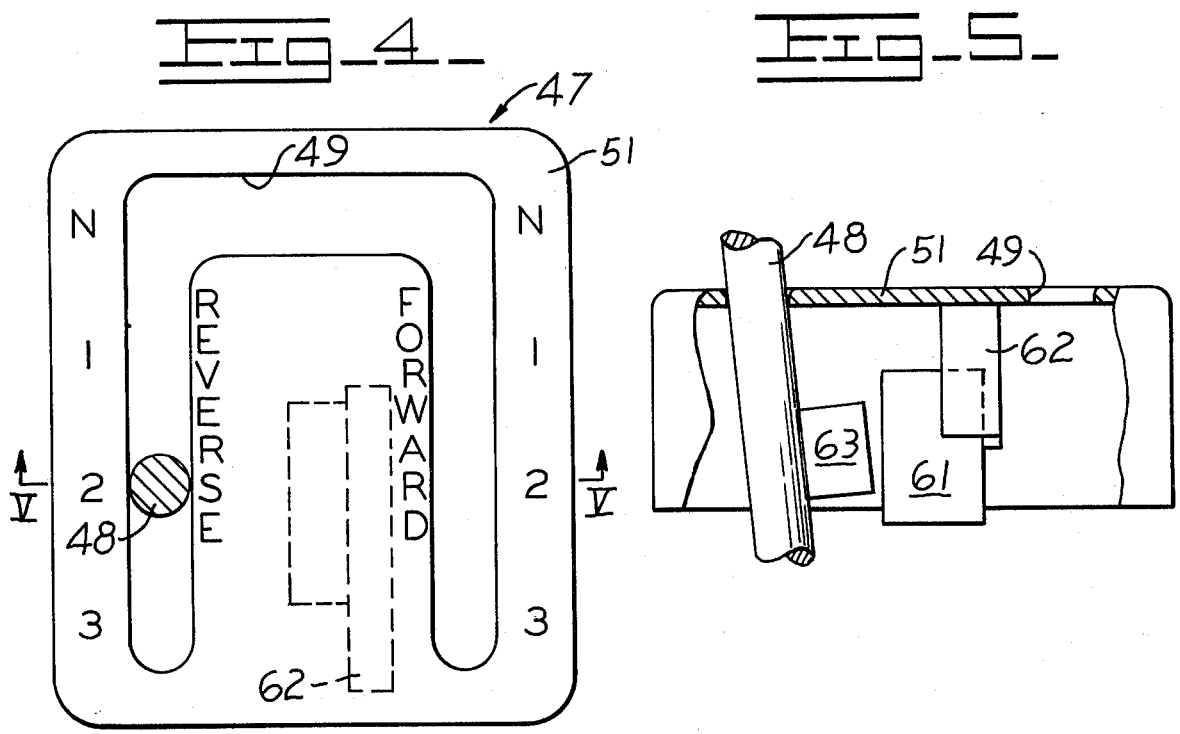
Fig_4_
Fig_5_
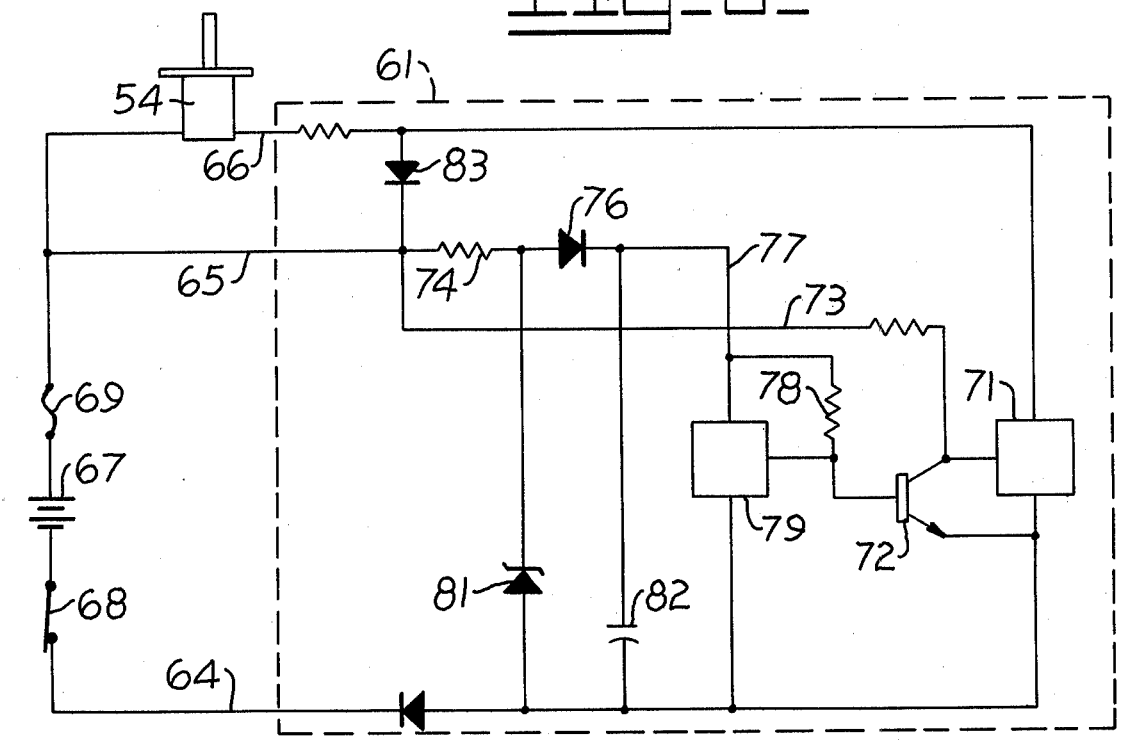
Fig_6_

ENGINE SPEED REDUCER RESPONSIVE TO POSITIONING OF THE TRANSMISSION SHIFT LEVER

BACKGROUND OF THE INVENTION

Track-type vehicles, such as crawler tractors and the like, are often used in highly populated areas where the noise produced by such vehicles is highly undesirable. One of the major contributors of noise pollution from such vehicles is the noise emitted from the tracks during operation. The track noise level increases as vehicle speed increases and in some instances the vehicle operators are instructed to refrain from operating the vehicle above a certain speed. In many cases, this is achieved simply by not operating the vehicle in a certain transmission gear range or setting. However, in many crawler tractors with power shift transmissions or the like, the speed of the vehicle is faster in reverse than in the same forward numerical gear range, i.e., first, second, third, etc. Thus, the track noise level may be acceptable in a particular forward gear range at the high idle engine speed setting and unacceptable in the same reverse gear range at the same engine speed. Since crawler tractors are commonly operated with the fuel control linkage and thus the engine speed at the high idle setting when operating in the forward direction, the operator must manually adjust the fuel control linkage to reduce the engine speed to comply with the noise restrictions whenever he shifts the transmission to change directions. In many vehicular operations, the operator is also manipulating hydraulic controls for repositioning the work tool at the same time he shifts the transmission and the added burden of adjusting the engine speed is both burdensome and fatiguing.

OBJECTS OF THE INVENTION

Accordingly, an object of this invention is to provide an improved engine speed reducer responsive to positioning of the transmission shift lever to limit the noise emitted from a track-type tractor in a particular transmission speed setting.

Another object of this invention is to provide such an engine speed reducer which automatically reduces the engine speed when the transmission shift lever is shifted into a particular setting and the engine speed is above a predetermined speed and which permits the engine to return to the predetermined speed when the transmission shift lever is shifted from that particular setting.

Other objects and advantages of the present invention will become more readily apparent upon reference to the accompanying drawings and following description.

BRIEF DESCRIPTION OF THE DRAWINGS

FIG. 2 is a sectional view taken along line II—II of FIG. 1.

FIG. 3 is a fragmentary somewhat enlarged side elevational view of the present invention.

FIG. 4 is a sectional view taken along line IV—IV of FIG. 1.

FIG. 5 is a sectional view through the shift console and taken along line V—V of FIG. 4.

FIG. 6 is a schematic view of an electrical switch for operating the engine speed reducer.

DESCRIPTION OF THE PREFERRED EMBODIMENT

Figure 1:
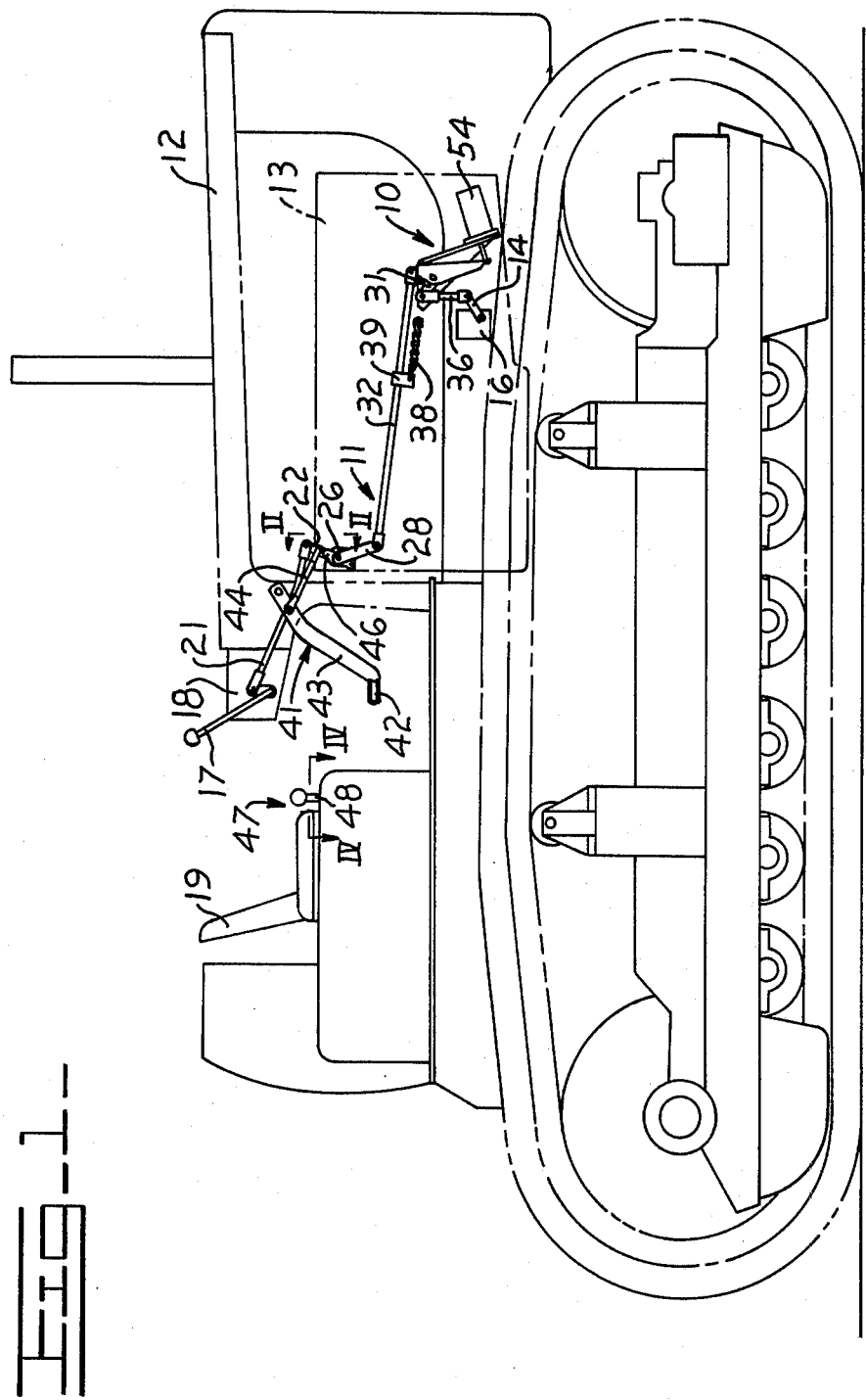
FIG. 1 is a side elevational view of an engine speed reducer responsive to positioning of the transmission shift lever embodying the principles of the present invention in association with a fuel control linkage of a track-type tractor.

Referring to the drawings, an engine speed reducer is generally indicated by the reference numeral 10 in association with a fuel control linkage 11 of a track-type tractor 12. The fuel control linkage controls the delivery of fuel to an engine 13 and hence the engine speed by controlling the pivotal position of a governor control lever 14 of a governor 16 in the usual manner. The fuel control linkage includes a hand control lever 17 pivoted on an instrument console 18 which is disposed ahead of an operator seat 19. A link 21 extends forwardly between the hand control lever and an upwardly extending lever 22 attached to an end of a shaft 23 protruding from one end of a one-way clutch 24 which provides a lost motion connection in the fuel control linkage for a later defined purpose. A shaft 26 extends from the opposite end of the one-way clutch and is pivotally carried by a pair of brackets 27 suitably fastened to the engine or other supporting structure of the vehicle. A downwardly extending lever 28 is attached to the outwardly extending end of the shaft 26 and is pivotally connected to a first arm 29 of a bell crank 31 by a link 32. The bell crank is pivoted on a pin 33 extending outwardly from a mounting bracket 34 secured to the side of the engine. A vertically extending link 36 extends between a second arm 37 of the bell crank and the governor control lever 14. A spring 38 has one of its ends anchored to the engine and its other end attached to a lug 39 secured to the link 32.

A decelerator arrangement 41 is operatively connected to the fuel control linkage and includes a pedal 42 fixed to the end of an arm 43 which is pivotally attached to the instrument console in the usual manner. A decelerator link 44 extends between the arm and a lever 46 which is secured to the shaft 26.

A transmission shift control arrangement 47 is positioned at one side of the operator's seat 19 and, as more clearly shown in FIGS. 4 and 5, includes an upwardly extending transmission shift lever 48 which extends through a U-shaped slot 49 formed in a console 51. The transmission shift lever is operative to shift a transmission, not shown, to determine the speed range and direction of travel of the vehicle and is manually selectively shiftable between three forward speed settings, three reverse speed settings and a neutral position.

The engine speed reducer 10 of the present invention includes a lever 52 which, as more clearly shown in FIG. 3, is pivotally mounted on the pin 33 and has a first end portion 53 adapted for abutment with the first arm 29 of the bell crank 31. An electrically actuated solenoid 54 is fastened to the mounting bracket 34 by a pair of bolts 56 and has a movable plunger 57 extending through a slot 58 formed in the opposite end portion of lever 52. A nut 59 is screw threaded onto the protruding end of the plunger for abutment with the lever to pivot it counterclockwise about the pin when the solenoid is energized.

As more clearly shown in FIGS. 4 and 5, an electrical switching device 61 which functions as a normally open or nonconductive switch is mounted to a bracket 62 secured to the underneath side of the shift console 51. The switching device is of the type which is closed when influenced by a magnet. For this purpose, a magnet 63 is attached to the transmission shift lever 47 and the electrical switching device is positioned so that it is closed or rendered conductive when the transmission shift lever is in the second reverse speed setting as shown in FIG. 4.

As more clearly shown in FIG. 6, the electrical switching device 61 has three lead lines 64, 65 and 66 extending therefrom with the lead line 64 being connected to the negative or ground terminal of a battery 67 through a manually operated on-off switch 68. The lead line 65 is connected to the positive terminal of the battery through a fuse 69. The lead line 66 is connected to one side of the solenoid 54 which has its other side connected to the positive terminal of the battery through the fuse. A Darlington amplifier 71 is connected in series with the lead lines 64 and 66 and is normally maintained in an off or nonconductive condition by an NPN transistor 72. With the Darlington amplifier turned off, the solenoid is de-energized. The emitter of the transistor is connected to the lead line 64 adjacent to the Darlington amplifier while its collector is connected to a line 73 which connects the line 65 to the Darlington amplifier to provide an actuating current thereto. A resistor 74 and a blocking diode 76 are serially connected in a line 77 which connects the lead line 65 to the base of the transistor through a resistor 78 and to a normally open or nonconductive integrated circuit electronic switch 79. The electronic switch is also connected to the base of the transistor and to the lead line 64 and is of the type which is rendered conductive by the influence of a magnet. With the electronic switch turned off, the transistor is turned on, which in turn connects the line 73 to the lead line 64 thereby clamping the Darlington amplifier in the off condition. When the electronic switch is turned on, it establishes a circuit from the base of the transistor to the ground potential, turning the transistor off. This removes the clamp from the Darlington amplifier allowing it to turn on to complete an electrical circuit to energize the solenoid. Thus, for purposes of the present invention, when the electronic switch is open or turned off, the electrical switching device is considered to be open to de-energize the solenoid and when the electronic switch is turned on the electrical switching device is considered to be closed to energize the solenoid.

A Zener diode 81 interconnects the line 64 with the line 77 ahead of the diode 76 to reduce the voltage on the line 77 to approximately 6.2 volts while a filter capacitor 82 connects the line 64 with the line 77 after its connection to the diode. A blocking or directional diode 83 is connected between the lines 65 and 66 and acts as a suppressor to prevent transients from affecting the electronic circuit as the solenoid is energized or de-energized.

OPERATION

While the operation of the present invention is believed clearly apparent from the foregoing description, further amplification will subsequently be made in the following brief summary of such operation. The fuel control linkage 11 which includes the hand control lever 17, is shown in a position for establishing maximum fuel delivery to the engine whereby the engine is running at maximum speed. The fuel control linkage is provided with a detent or similar mechanism, not shown, to maintain the hand control lever in a preselected position. Clockwise rotation of the hand control lever results in clockwise rotation of the governor control lever 14 to reduce the amount of fuel delivered to the engine to reduce the speed of the engine. It is to be understood that all levers forming part of the fuel control linkage rotate in unison upon rotation of the hand control lever and are rotatable between first and second positions in which the engine speed is at a low idle speed and the maximum speed, respectively.

When the transmission shift lever 48 is shifted to the second reverse speed setting as shown in FIG. 4, the magnet 63 is moved into close proximity with the electrical switching device 61 where the influence of the magnet renders the electrical switching device conductive to energize the solenoid 54 as previously described. Energizing the solenoid causes the plunger 57 to retract to pivot the lever 52 about the pin 33. In so doing, the end portion 53 of the lever engages the first arm 29 of the bell crank 31 pivoting it counterclockwise about the pin 33 causing the link 36 to pivot the governor control lever 14 clockwise toward a reduced fuel setting to reduce the engine speed and establish an intermediate speed of the engine. The intermediate speed is selected to provide a vehicle speed comparable to the second forward speed or a vehicle speed in which the track noise is below a predetermined level.

The one-way clutch 24 in the fuel control linkage 11 permits rotation of the shaft 26 without affecting the position of the hand control lever 17. As the bell crank 31 is rotated counterclockwise about its pivot, the link 32 is moved rearwardly against the bias of the spring 38. When the transmission shift lever 48 is shifted from the second reverse speed setting to any other setting, the electrical switching device 61 is opened or rendered nonconductive to de-energize the solenoid 54 permitting the plunger 57 to extend to its normal position. This permits the spring 38 to move the link 32 forwardly to pivot the bell crank clockwise and return the governor lever 14 to its maximum fuel setting and hence the engine speed to its maximum operating speed. With the solenoid de-energized, the lever 52 does not interfere with normal operation of the fuel control linkage.

In view of the foregoing, it is readily apparent that the structure of the present invention provides an improved engine speed reducer for reducing the engine speed in response to positioning of the transmission shift lever in a particular transmission speed setting. Reducing the engine speed automatically reduces the potential vehicle speed and hence the noise emitted from the tracks of the vehicle. The automatic reduction of the engine speed is accomplished through the lever and solenoid apparatus positioned so that the lever engages the bell crank of the fuel control linkage to move it to a reduced fuel setting when the solenoid is energized. The solenoid is energized automatically by turning on the electrical switching device when the transmission shift lever is shifted to the second reverse speed setting. When the transmission shift lever is shifted to any other setting, the electrical switching device is turned off to de-energize the solenoid thereby permitting a spring to return the fuel control linkage to its original setting as dictated by the position of the hand control lever.

While the invention has been described and shown with particular reference to the preferred embodiment, it will be apparent that variations might be possible that would fall within the scope of the present invention, which is not intended to be limited except as defined in the following claims.

What is claimed is:

1. In a track-type vehicle of the type having an engine, a control linkage for selectively setting the engine speed between a low idle speed and a predetermined high speed, a transmission shift lever for selectively determining the vehicle speed range and its direction of travel and shiftable between at least one forward and one reverse speed setting, the improvement comprising:

an actuating lever operatively associated with the control linkage and having a first noninterferring position relative to the control linkage and rotatable to a second position for engaging and moving the control linkage in a direction for reducing the engine speed to an intermediate speed slower than the predetermined high speed;

a solenoid having a plunger connected to the lever;

a source of electrical power;

means for connecting the source of electrical power to the solenoid including a normally nonconductive switch which normally maintains the solenoid in a de-energized condition, said switch positioned to be closed in response to shifting the transmission shift lever to the one reverse speed setting whereby closing of the switch energizes the solenoid to move the lever to its second position;

a magnet attached to the transmission shift lever and wherein the switch is an electrical switching device of the type which is rendered conductive by the influence of the magnet;

said control linkage including a lever rotatable between a first position in which the engine speed is at the low idle speed and a second position in which the engine speed is at the predetermined high idle speed, said lever being positioned to be engaged by said actuating lever to rotate the lever to a third position to establish the intermediate speed of the engine when the solenoid is energized; and wherein the control linkage includes a hand control lever manually positionable for rotating the lever between its first and second positions, and a one-way clutch to permit the lever to be rotated to the third position without affecting the position of the hand control lever.

2. The combination of claim 1 wherein shifting the transmission from the one reverse speed setting opens the switch to de-energize the solenoid, and including a spring operatively attached to the control linkage to return the lever to its second position when the solenoid is de-energized.

3. In a vehicle of the type having an engine, a control linkage for selectively setting the engine speed between a low idle speed and a predetermined high speed, said control linkage including a first lever rotatable between a first position in which the engine speed is at the low idle speed and a second position in which the engine speed is at the predetermined high speed, and a transmission shift lever for selectively determining the vehicle speed range and its direction of travel and shiftable between at least one forward and one reverse setting, the improvement comprising:

an actuating lever disposed adjacent to said first lever and having opposite ends with one of said ends adapted for engagement with said first lever;

an electrically actuated solenoid having a plunger connected to the other end of the actuating lever and being of a construction sufficient for rotating the actuating lever and hence said first lever from the second position to a third position to reduce the engine speed from its preselected high speed to establish an intermediate speed of the engine;

a magnet attached to the transmission shift lever;

a source of electrical power;

means for connecting the source of electrical power to the solenoid including a normally opened electrical switching device which normally maintains the solenoid in a de-energized condition, said electrical switching device being of the type which is closed by the influence of the magnet and being positioned to be closed by the magnet automatically in response to shifting the transmission shift lever to the one reverse speed setting whereby closing of the electrical switching device energizes the solenoid automatically to move the lever from the second position to the third position to reduce the engine speed from the predetermined high speed to the intermediate speed; and wherein the control linkage includes a hand control lever manually positionable for controlling the position of said first lever and a lost motion connection means disposed between the hand control lever and said first lever to permit said first lever to be rotated to its third position without affecting the position of the hand control lever and including a spring operatively attached to the control linkage to return said first lever to its second position when the solenoid is de-energized.

* * * * *